Dec. 13, 1938.   W. G. O. STIEBER   2,140,435
BEARING
Filed Oct. 22, 1937

Inventor:
Wilhelm Gustav Otto Stieber
by Marc A. Mayr
Attorney.

Patented Dec. 13, 1938

2,140,435

UNITED STATES PATENT OFFICE 2,140,435

BEARING

Wilhelm Gustav Otto Stieber, Munich, Germany

Application October 22, 1937, Serial No. 170,339
In Germany June 19, 1937

8 Claims. (Cl. 308—236)

The present invention relates to a bearing in which the clearance can be adjusted.

Devices are known in the art by means of which the clearance of the bearing can be adjusted. In these devices the form-stability of the bearing is very often reduced by the arrangement of slots; besides this, there are unsymmetric forces, or forces which act on certain points only which forces change the cylindrical form of the bearing surface in a not uniform manner and also dislocate the axis of the bearing.

With other known devices the action is comparatively small and the necessary forces and the arrangements for producing said forces are comparatively large.

It is an object of the present invention to eliminate these disadvantages by providing a part of the bearing with a cone shaped bushing the cone surface of which, by means of axial displacement of a second cone shaped bushing, can be pressed towards the first bushing whereby a deformation of the first bushing and the bearing member connected therewith in essentially radial direction is produced.

Further and other objects of the present invention will be hereinafter set forth in the accompanying specification and claims and are shown in the drawing which, by way of illustration schematically shows what I now consider to be three preferred embodiments of my invention.

Figure 1:
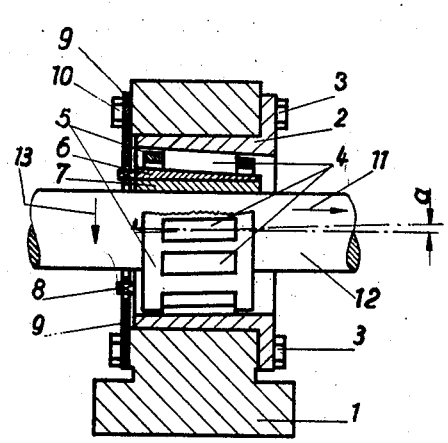
Figure 1 is a part longitudinal sectional view of a plain bearing according to the present invention.

Referring more particularly to Fig. 1 of the drawing, a bushing 2 is arranged within a bearing body 1 which bushing is held to the body 1 by means of screws 3. The interior bore of the bushing is cone shaped. Within said bore is a bushing 6, which has a suitable countercone and which is, however, of smaller diameter. In between the cone surfaces of the bushings 2 and 6, distributed over the entire circumference, rollers 4 are provided, which are guided, for example, in a cage 5 in such manner that the axes of the rollers are twisted with respect to the axis of the shaft 12 by a generally small angle "a". The openings in the cage can be of such formation that two or more rollers can be located in one opening. Instead of cage 5 other provisions can be made for assuring the twisted position of the rollers.

The bearing proper 7 on which the shaft 12 rests is located in the bushing 6. Bushing 6 and bearing 7 can also be made of one piece.

Bushing 6 carries teeth 8 which fit into the intervals between corresponding teeth in disk 9. Disk 9 may be held in position, for example, by means of clamp screws 10. Disk 9 and the screws 10 together secure bushing 6 against torsion. Bushing 6 and bearing 7 may be split into a plurality of parts. A plurality of cages with a plurality of rows of rollers may be arranged side by side.

If one removes the members 9 and 10 and turns bushing 6 in the direction of arrow 13, i. e., clockwise when looking from left to right on Fig. 1, bushing 6 rolls on the interior cone of bushing 2 by means of the rollers 4. Due to the twisted position shown by the angle "a" of rollers 4 with respect to the axis of the shaft there is at the same time an axial movement of bushing 6 in the direction of arrow 11. Due to the cone shaped configuration of bushings 2 and 6 pressures are exerted between the cone surfaces and the rollers which are so great that bushing 6 and bearing 7 are radially compressed. The clearance between the bearing 7 and the shaft 12 is thereby reduced.

Figure 2:
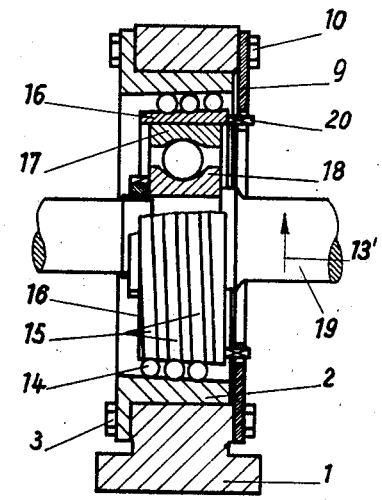
Fig. 2 is a part longitudinal sectional view of a ball bearing according to the present invention.

In the embodiment of my invention according to Fig. 2 of the drawing, a bushing 2, is located within the bearing body 1 and is held thereto by means of screws 3. The bore of bushing 2 is cone shaped. Balls 14 are situated within said bore which balls are guided in spiral groves 15 of a suitable cone shaped bushing 16. These groves may also be provided in bushing 2 or in both bushings 2 and 16. Bushing 16 has teeth 20 which cooperate with clearances in disk 9 which is secured against torsion by means of screws 10 which rigidly connect disk 9 with the body 1. Bushing 16 and ball race 17 may be made of one piece.

If, after removal of members 9 and 10, bushing 16 is revolved in the direction of the arrow 13, it rolls on bushing 2 by means of balls 14 whereby an axial movement is produced according to the pitch of groves 15, which movement causes great pressure between the surfaces 2 and 16 and the balls 14.

The pressure causes a radial deformation of the bushing 16 and the ball race 17 and thereby changes the clearance of the ball bearing.

Groves 15 and balls 14 according to Fig. 2 may also be provided in the embodiment of my invention shown in Fig. 1, the latter instead of the rollers 4. Rollers 4 and cage 5 according to Fig. 1 may be used in connection with ball bearings as used in the embodiment of the present invention according to Fig. 2.

The action of both arrangements is principally the same. Revolving of bushings 6 in Fig. 1 and 16 in Fig. 2 requires comparatively little power because rolling friction only need be overcome.

Figure 3:
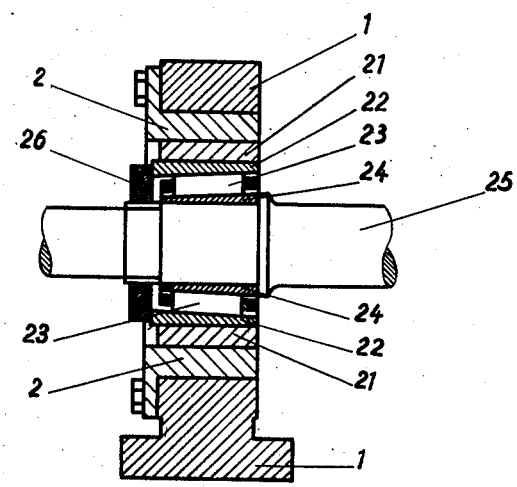
Fig. 3 is a longitudinal sectional view of a plain bearing according to the present invention.

In Fig. 3 another embodiment of the present invention is shown; this embodiment is shown as applied to a plain bearing. Bushing 2 which forms the bearing is rigidly connected to the bearing body 1.

A bushing 21 serving as revolving bushing rests on a bushing 22, having a cone shaped bore. Within said bore rollers 23 are located in twisted position as they are in the embodiment illustrated in Fig. 1; the rollers roll on a bushing 24 having a cone shaped outer surface and being fixed to shaft 25.

In place of the rollers in twisted position balls which are guided in groves may be used, as are shown in Fig. 2.

Bushing 24 and shaft 25 as well as bushings 21 and 22 may be made of one piece.

In the embodiment of the invention shown in Fig. 3 ring 26 which is screwed to shaft 25 serves for locking bushing 22 in its position. If ring 26 is loosened and bushing 22 is revolved, an axial displacement of bushing 22 with respect to bushing 24 takes place. The forces created thereby increase the diameter of bushing 22 and of bushing 21. Thereby the clearance of the plain bearing is changed. The arrangement can also be used for a roller bearing.

The bearing construction as per the present invention is particularly useful, where the clearance must be held as small as possible for assuring exact operation of a shaft or a spindle.

The bearing construction according to the present invention whereby the clearance can be adjusted at will is also useful for testing ball- or roller bearings on the test bed; bearings have different clearances according to their operating conditions; by means of the present invention any clearance, i. e., any operating condition can be established on the test bed.

While I believe the above described embodiments of my invention to be preferred embodiments, I wish it to be understood that I do not desire to be limited to the exact details of design and construction shown and described, for obvious modifications will occur to a person skilled in the art.

I claim:

1. A bearing for supporting a part which is rotatable in said bearing, said bearing having an adjustable clearance and comprising a pair of members provided with cone shaped surfaces which surfaces are disposed substantially concentric within one another, roller means displaced in between said cone shaped surfaces, one of said members being axially displaceable whereby said members are pressed toward said means with more or less pressure and at least one of said members is radially deformed and the clearance of the bearing changed.

2. A bearing for supporting a part which is rotatable in said bearing, said bearing having an adjustable clearance and comprising a pair of members provided with cone shaped surfaces which surfaces are disposed substantially concentric within one another, roller means displaced in between said cone shaped surfaces, and being in a twisted position with respect to the axis of rotation of said bearing, one of said members being axially displaceable whereby, due to said twisted position, said members are pressed toward said means with more or less pressure and at least one of said members is radially deformed and the clearance of the bearing changed.

3. A bearing for supporting a part which is rotatable in said bearing, said bearing having an adjustable clearance and comprising a pair of members provided with cone shaped surfaces which surfaces are disposed substantially concentric within one another, roller means displaced in between said cone shaped surfaces, a cage having openings which accommodate said roller means and which are in a twisted position with respect to the axis of rotation of said bearing thereby holding said roller means in twisted position, one of said members being axially displaceable whereby due to said twisted position, said members are pressed toward said means with more or less pressure and at least one of said members is radially deformed and the clearance of the bearing changed.

4. A bearing having an adjustable clearance and comprising a pair of members with cone shaped surfaces which surfaces are disposed substantially concentric within one another, rolling means displaced in between said cone shaped surfaces, guide means which are in twisted position with respect to the axis of rotation of said bearing and adjacent to and adapted to guide said rolling means, one of said members being axially displaceable whereby said members are pressed towards said means with more or less pressure and at least one of said members is radially deformed and the clearance of the bearing is changed.

5. A bearing having an adjustable clearance and comprising a pair of members with cone shaped surfaces which surfaces are disposed substantially concentric within one another, balls displaced in between said cone shaped surfaces, a spiral grove in one of said surfaces adjacent to and guiding said balls, one of said members being revolvable whereby, due to said balls and spiral groves, said members move in axial direction with respect to one another and said members are pressed towards one another, the pressure being transmitted from one member to the other by means of said balls, and at least one of said members is radially deformed, and the clearance of said bearing is changed.

6. A bearing for supporting a part which is rotatable in said bearing, said bearing having an adjustable clearance and comprising a pair of members provided with cone shaped surfaces which surfaces are disposed substantially concentric within one another, roller means displaced in between said cone shaped surfaces, one of said members being axially displaceable whereby said members are pressed towards said means with more or less pressure and at least one of said members is radially deformed and the clearance of the bearing changed, both of said members being stationary, i. e. do not take part in the rotation of the part supported by said bearing.

7. A bearing for supporting a part which is rotatable in said bearing, said bearing having adjustable clearance and comprising a pair of members provided with cone shaped surfaces which surfaces are disposed substantially concentric within one another, roller means displaced in between said cone shaped surfaces, one of said members being axially displaceable whereby said members are pressed towards said means with more or less pressure and at least one of said members is radially deformed and the clearance of the bearing changed, both of said members being connected to and rotating with the part supported by said bearing.

8. A bearing for supporting a part which is rotatable in said bearing, said bearing having an adjustable clearance and comprising a pair of members provided with cone shaped surfaces which surfaces are disposed substantially concentric within one another, roller means displaced in between said cone shaped surfaces, one of said members being axially displaceable whereby said members are pressed towards said means with more or less pressure and at least one of said members is radially deformed and the clearance of the bearing changed, a holding member which is adjustably connected with one of said first mentioned members and which is also connected with the other of said first mentioned members whereby the position of said first mentioned members with respect to one another is adjustably maintained.

WILHELM GUSTAV OTTO STIEBER.